UNITED STATES PATENT OFFICE.

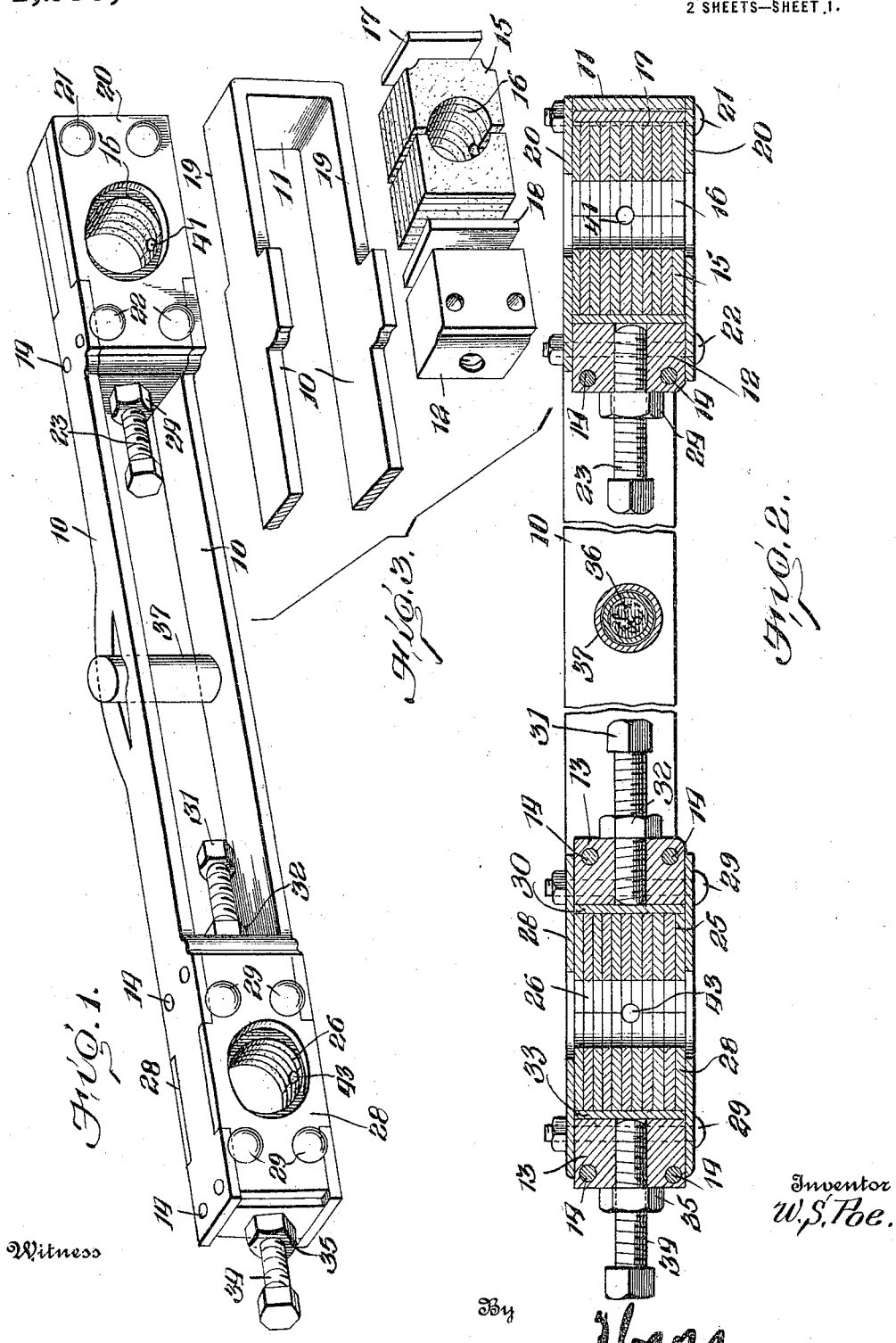

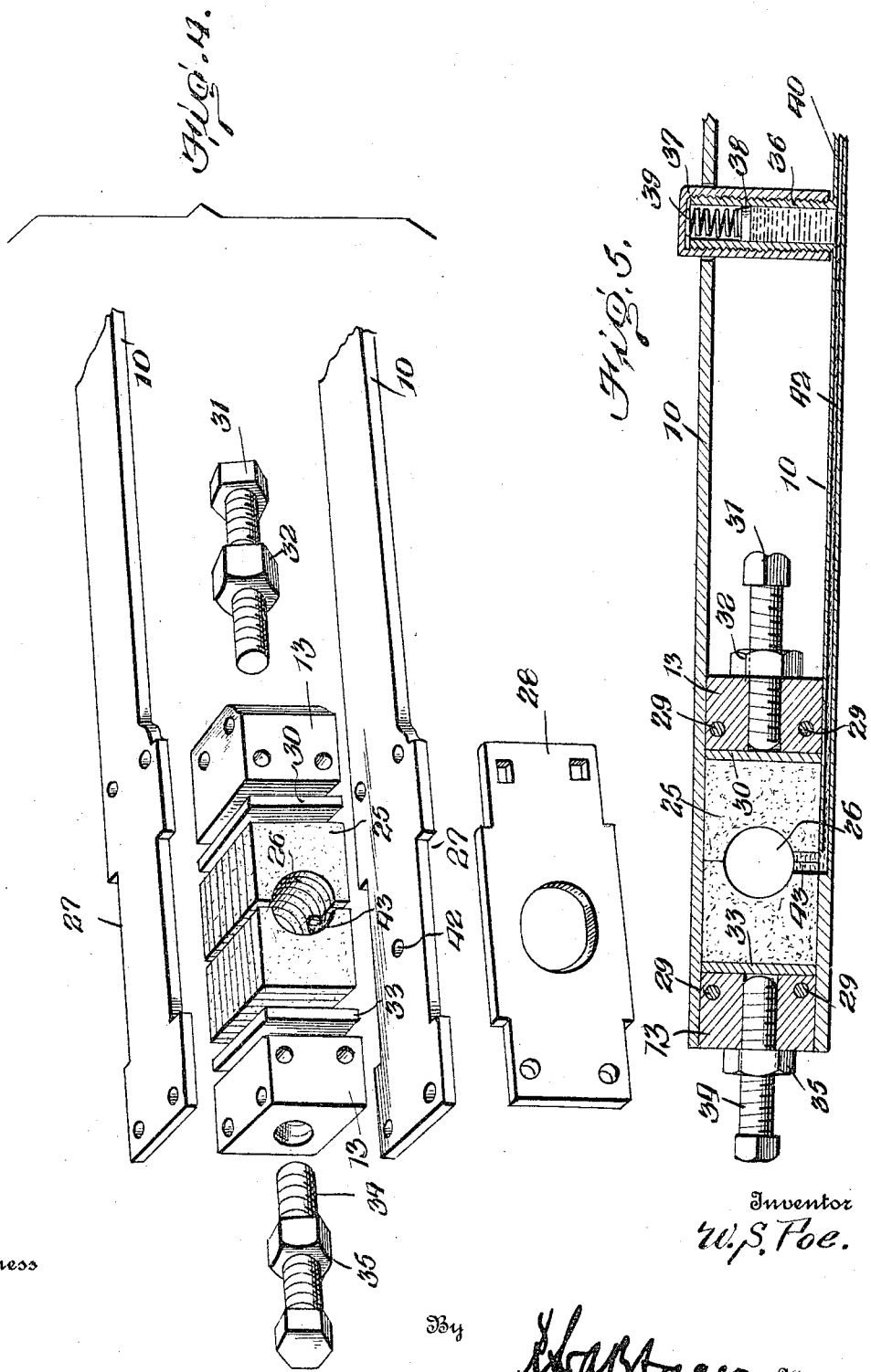

WILLIAM S. POE, OF HAY, WASHINGTON.

PITMAN.

1,235,839.  Specification of Letters Patent.  Patented Aug. 7, 1917.

Application filed January 25, 1917. Serial No. 144,491.

*To all whom it may concern:*

Be it known that I, WILLIAM S. POE, a citizen of the United States, residing at Hay, in the county of Whitman and State of Washington, have invented certain new and useful Improvements in Pitmen, of which the following is a specification.

This invention relates to an improved pitman and has as its primary object to provide a device of this character having fibrous journal bearings and wherein the wear in the said bearings may be adjustably taken up so that the said bearings may at all times snugly engage the journals.

The invention has as a further object to provide a device of this character wherein a lubricant will be automatically supplied to the bearings for lubricating the journals.

And the invention has as a still further object to provide a pitman wherein the bearings may be easily removed so that when the said bearings become worn out, they may be readily replaced.

Other and incidental objects will appear as the description proceeds and in the drawings wherein I have illustrated the preferred embodiment of the invention and wherein similar reference characters designate corresponding parts throughout the several views:

Figure 1 is a perspective view of my improved pitman, showing the arrangement of bearings at opposite ends of the pitman;

Fig. 2 is a horizontal sectional view more particularly showing the construction and mounting of the bearings;

Fig. 3 is a fragmentary perspective view, illustrating the bearing at the inner end of the pitman, the said bearing and its associated parts being removed;

Fig. 4 is a fragmentary perspective view, showing the bearing at the outer end of the pitman, the parts being detached but in proper operative position;

Fig. 5 is a fragmentary vertical sectional view, showing the lubricator employed for automatically lubricating the bearings and the channels leading from the said lubricator to the bearings.

In carrying out the invention, my improved pitman is formed with a body including upper and lower parallel bars 10 joined by a connecting portion 11. The body as thus formed may be constructed from a single length of material bent into desired shape. Arranged between the bars 10 adjacent the inner extremity of the pitman is a block 12 confronting the connecting portion 11 in spaced relation thereto. Mounted between the said bars adjacent the outer extremity of the said pitman are similar spaced blocks 13. All of these blocks are connected with the said bars by a plurality of transversely arranged pins 14 extending through the bars.

Mounted between the block 12 and the connecting portion 11 of the pitman, is a sectional bearing 15. This bearing is formed of a plurality of layers of leather or other similar fibrous material with the said bearing split transversely at the journal opening 16 therein. Arranged between one end of the bearing and the connecting portion 11, is a plate 17 and mounted between the opposite end of the bearing and the block 12, is a follower or plate 18.

The bars 10, between the block 12 and connecting portion 11 of the pitman, are notched or cut-away, as shown at 19, and fitted in said notches to overlie opposite sides of the bearing are retaining plates 20 therefor. These plates terminate flush with the outer side faces of the bars 10 and at their inner extremities overlie the block 12. Extending between the outer extremities of the said plates and overlying the longitudinal edges of the plate 17, are spaced bolts or other suitable fastening devices 21 detachably connecting the said plates and it will be observed, upon reference to Fig. 3, that the outer corners of the bearing 15 are cut-away to receive the said bolts. Extending between the inner extremities of the plates 20 and fitted through the block 12, are spaced bolts 22 similar to the bolts 21. The bolts 21 and 22 thus detachably connect the plates 20 with the pitman with the said plates acting to hold the bearing 15 in position. When desired, the plates 20 may be easily removed for replacing the said bearing when worn out.

Threaded through the block 12 between the bars 10, is a take up screw 23 engaging, at its inner extremity, with the follower 18 and provided with a jam nut 24 to seat against the outer side of the block 12 for holding the said screw at adjustment. Accordingly, it will be seen that as the journal opening 16 in the bearing 15 becomes worn, the screw 23 may be adjusted to shift the follower 18 toward the connecting portion 11 of the pitman and adjust the inner section of the bearing 15 toward the outer section thereof to snugly fit around the journal received by the said pitman and take up such wear.

Mounted between the blocks 13 at the outer end of the pitman, is a sectional bearing 25, similar to the bearing 15. The bearing 25 is also preferably constructed of a plurality of layers of leather or other similar fibrous material with the said bearing split at the journal opening 26 therein. The bars 10 are notched or cut-away between the blocks 13, as shown at 27, and fitting in said notches to overlie opposite sides of the bearing, are retaining plates 28 therefor, these plates being similar to the retaining plates 20. The plates 28, at their extremities, overlie the blocks 13 and freely fitted through the said plates and through the said blocks are a plurality of bolts or other suitable fastening devices 29 connecting the plates and detachably supporting the said plates to retain the bearing 25 in position. Arranged between the inner extremity of the bearing and the adjacent block 13, is a follower or plate 30 and threaded through the said block between the bars 10, is a take up screw 31 engaging at its inner extremity with the said follower and provided with a jam nut 32 to engage the block. Arranged between the outer extremity of the bearing 25 and the outermost block 13, is a follower or plate 33, similar to the follower 30 and screw threaded through the outer block 13 is a take up screw 34, similar to the screw 31, and provided with a jam nut 35.

It will now be observed that when any wear occurs in the journal opening 26 of the bearing 25, either the screw 31 or the screw 34 may be adjusted to shift one section of the bearing toward the other for taking up such wear, the said screws acting upon the followers 30 and 33 to clamp the sections of the bearing together. Furthermore, the screws 30 and 34 may be adjusted with respect to each other for positioning the bearing 25 longitudinally of the pitman with respect to the bearing 15. When the bearing 25 becomes worn out, the plates 28 may be easily removed for renewing the said bearing.

Associated with the bearings 15 and 25, is an automatic lubricator therefor. This lubricator includes a cup 36 mounted upon the lowermost of the bars 10 of the pitman at a point substantially midway between the ends thereof and projecting upwardly through the uppermost bar. Screw threaded over this cup is a cap 37. Slidably mounted within the cup is a plunger 38 and bearing between the said plunger and the cap 37 is a spring 39 tending to force the plunger downwardly within the cup for expelling the lubricant therefrom. Leading from the bottom of the cup 36 through the lowermost of the bars 10, is a channel 40 which, at its outer extremity, registers with an opening 41 formed through the adjacent side of the bearing 15. Leading from the bottom of the cup through the lowermost bar 10 is a second channel 42 which, at its outer extremity, registers with an opening 43 formed through the adjacent side of the bearing 25. Consequently, as will be clear, the plunger 38 will normally act to force the lubricant within the cup 36 through the channels 40 and 42 to emerge through the openings 41 and 43 in the bearings 15 and 25 for automatically lubricating the journals at the said bearings.

It will, therefore, be seen that I provide a particularly practical and efficient construction for the purpose set forth. Fibrous bearings are employed and any wear occurring in these bearings may be readily taken up. Furthermore, the bearings may be easily removed, when desired, and will, at all times, be automatically kept well lubricated.

Having thus described the invention, what is claimed as new is:

1. A device of the character described including a body, spaced blocks fixed thereon, a sectional bearing mounted upon the body between said blocks, and means adjustable through the said blocks to coöperate with the said bearing sections for taking up wear between the sections of the bearing.

2. A device of the character described including a body, a block carried thereby, a sectional bearing mounted upon the body adjacent said block, a follower arranged to co-act with one of said bearing sections, and a take up screw adjustable upon the said block to engage the said follower for shifting said bearing section relative to the other section of the bearing for taking up wear between the said bearing sections.

3. A device of the character described including a body formed from a length of material bent to provide spaced bars, blocks interposed between the said bars, sectional bearings mounted between the bars adjacent said blocks, retaining plates co-acting with the said bars to overlie opposite sides of the bearings for retaining the bearings in position, and means adjustable upon the said blocks for shifting one section of each bearing relative to the other section thereof to take up wear between the said bearing sections.

4. A device of the character described including a body having channels formed therein, a lubricator communicating with said channels, and spaced bearings carried by the body and provided with openings registering with the said channels with the said lubricator adapted to feed lubricant through the said channels to be supplied to the said bearings at said openings.

5. A device of the character described including spaced bars, spaced blocks fixed between the said bars, spaced bearings mounted between the bars, one of said bearings being formed of sections and being arranged between the said blocks, and coacting means adjustable through the said blocks to coöperate with the said bearing sections for positioning the sections of the bearing with respect to each other to take up wear therebetween, the said means being operable for adjusting the sectional bearing with respect to the other bearing.

6. A device of the character described including spaced bars, a block fixed between the said bars, a sectional bearing mounted between the bars adjacent said block, means adjustable through the block to coöperate with one of said bearing sections for taking up wear between the sections of the bearing, and retaining plates extending between the bars and connected to said block for holding the bearing sections in position.

7. A device of the character described including spaced bars having notches formed in the edges thereof, a bearing mounted between the bars, and plates fitting in said notches and overlying the sides of the bearing for retaining the bearing in position.

In testimony whereof I affix my signature.

WILLIAM S. POE. [L. S.]

Copies of this patent may be obtained for five cents each, by addressing the "Commissioner of Patents, Washington, D. C."